No. 713,339. Patented Nov. 11, 1902.
R. B. PAXTON & J. B. DRISCOLL.
BRAKE ADJUSTER.
(Application filed June 20, 1901.)
(No Model.) 3 Sheets—Sheet 1.
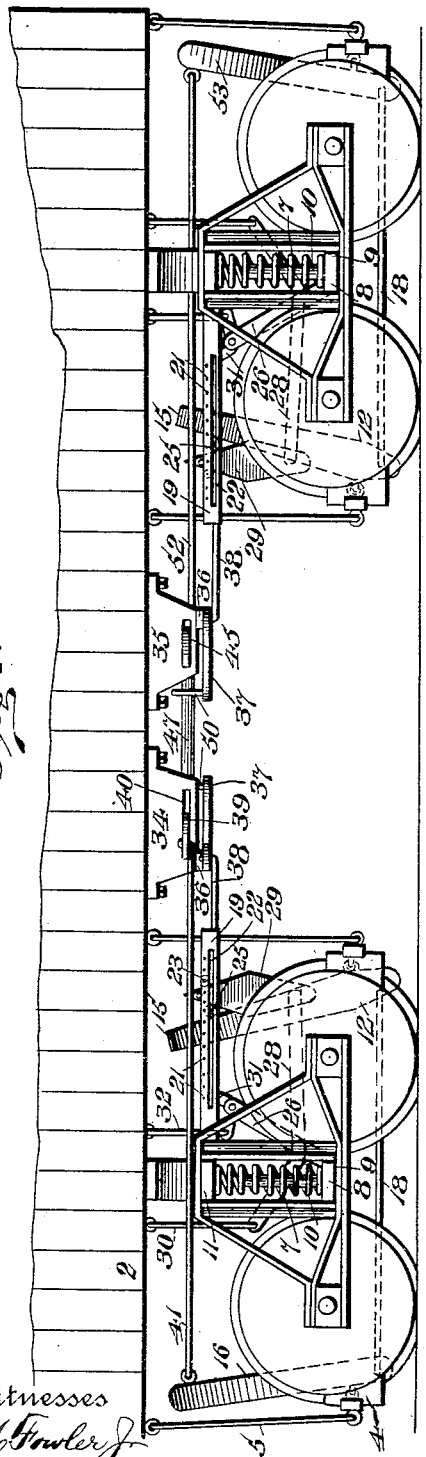
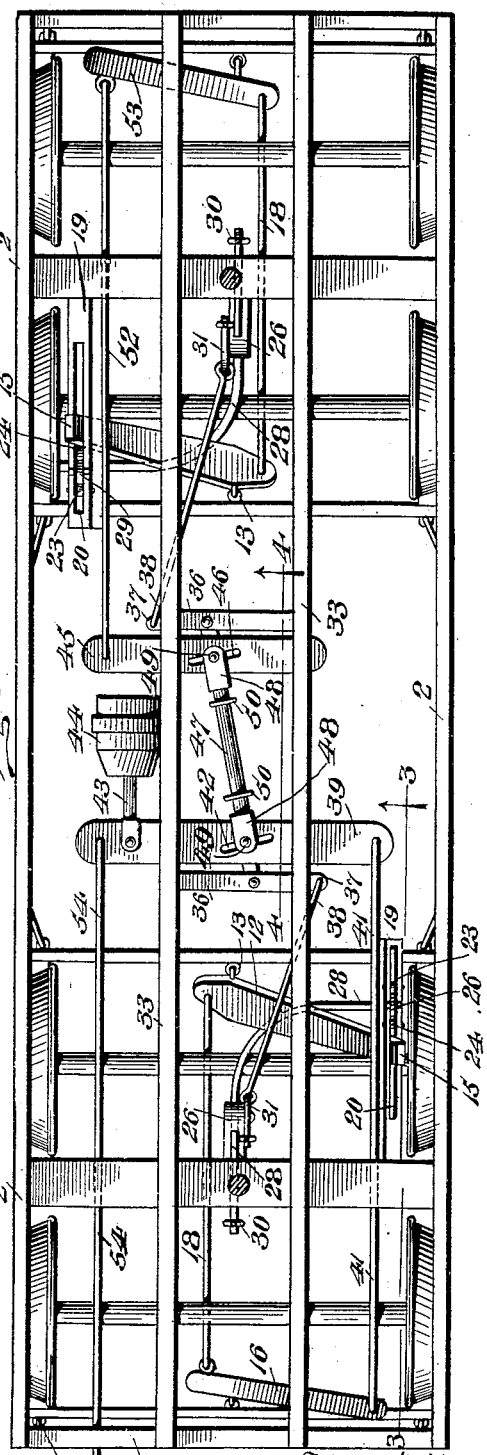

No. 713,339. Patented Nov. 11, 1902.
R. B. PAXTON & J. B. DRISCOLL.
BRAKE ADJUSTER.
(Application filed June 20, 1901.)
(No Model.) 3 Sheets—Sheet 2.
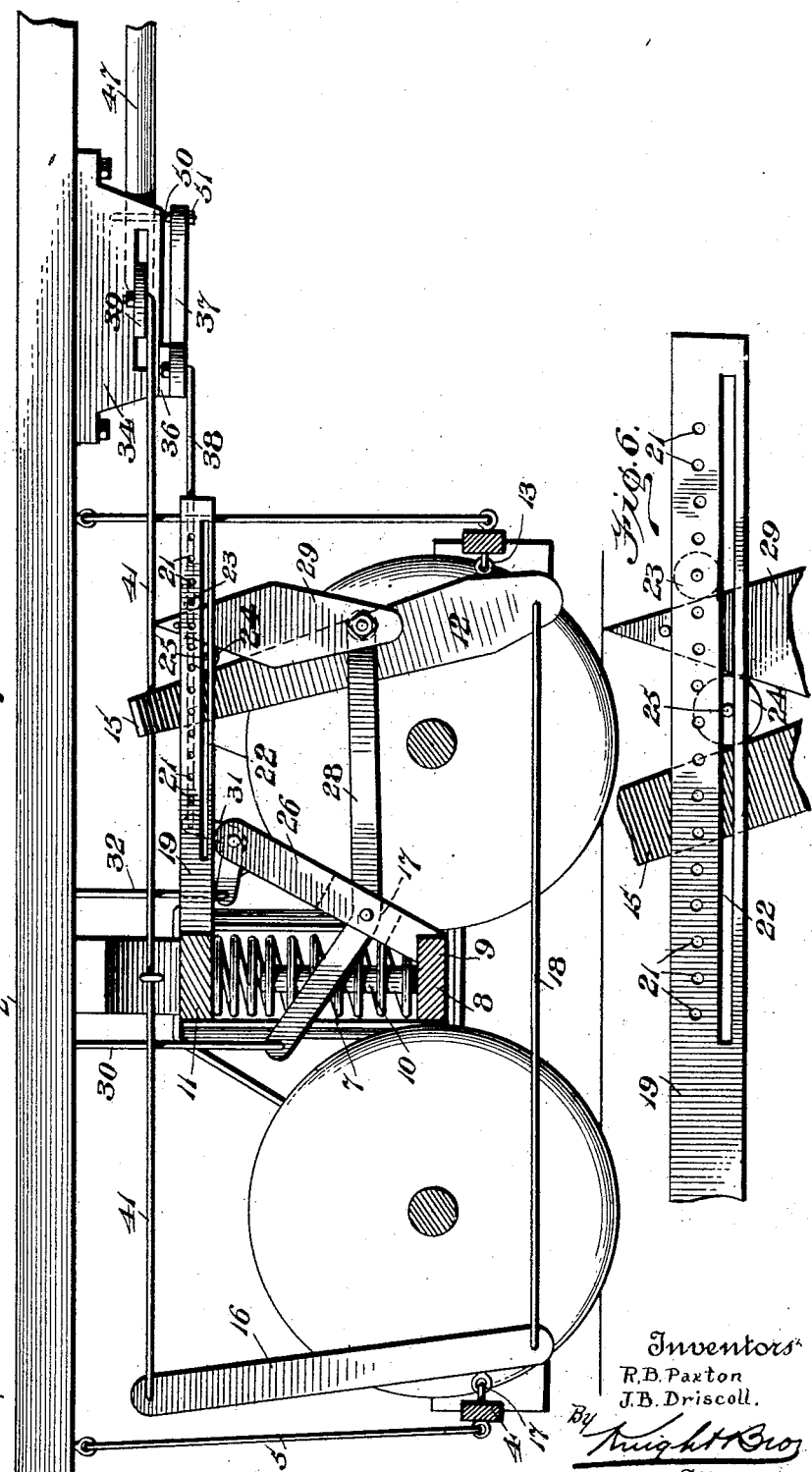
Witnesses
Inventors
R.B. Paxton
J.B. Driscoll.
Attorneys

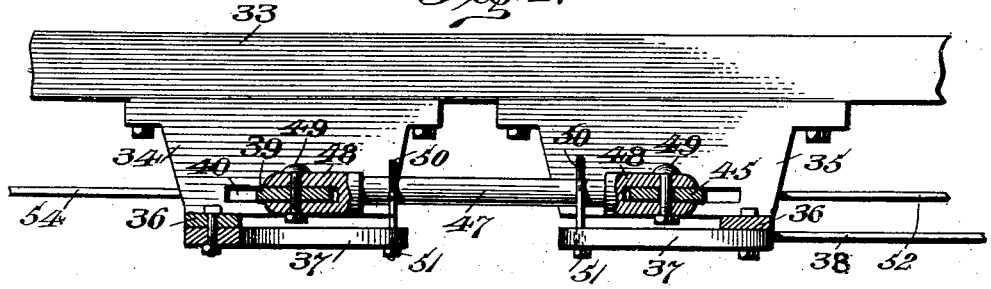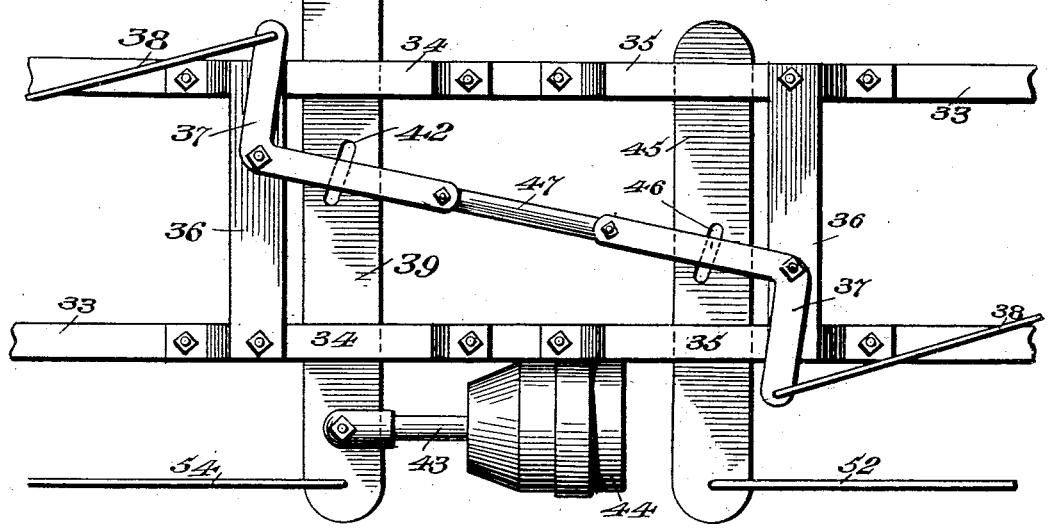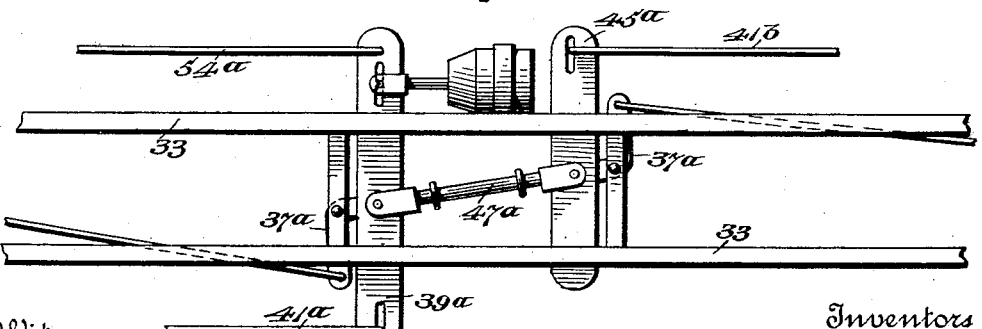

UNITED STATES PATENT OFFICE.

ROBBERT B. PAXTON AND JOSEPH B. DRISCOLL, OF CLIFTONFORGE, VIRGINIA.

BRAKE-ADJUSTER.

SPECIFICATION forming part of Letters Patent No. 713,339, dated November 11, 1902.

Application filed June 20, 1901. Serial No. 65,349. (No model.)

*To all whom it may concern:*

Be it known that we, ROBBERT B. PAXTON and JOSEPH B. DRISCOLL, citizens of the United States, and residents of Cliftonforge, county of Alleghany, and State of Virginia, have invented certain new and useful Improvements in Brake-Adjusters, of which the following is a specification.

In the operation of the braking apparatus of railway-trains it is found, particularly with mixed freight-trains, that the degree of pressure that can be effectively employed in arresting the movement of cars varies according to the weight of cars and the load carried thereby. In the ordinary construction the brake-beam carrying the brake-shoes is suspended by links from the platform of the car, so that the brake-shoe is substantially in the same longitudinal plane as the axle of the truck. When a load is placed upon a platform, said platform is of course lowered by reason of the weight, thereby carrying with it the brake-shoes, thus changing the position of the brake-shoes to a lower plane than that in which they were normally set. This causes a slack, inasmuch as the brake-shoes are farther from the periphery of the wheel, thereby necessitating a longer leverage in applying the brakes. This slack has been overcome by changing the position of the dead-lever and securing it in that position after the car is loaded; but the objection to this method is that unless the dead-lever is again adjusted after the car is empty the brakes will stick to the wheels, whereupon the wheels will slide and become flattened and rendering them unfit for use. Various other means have been employed to overcome this objection in braking apparatus without entirely removing the objection.

The present invention has for its object to guard against the locking of the wheels by the brake-shoes, which is accomplished by means whereby the slack in the braking apparatus is taken up uniformly throughout the train, but at the same time according to the weight deposited over each truck.

This invention consists, further, of means for taking up the slack of the braking apparatus on one truck of a single car without affecting or operating—that is to say, without changing—the position of the braking apparatus on the other end of the car.

This invention consists, further, in the parts and combination of parts, as will be hereinafter more fully set out.

In the drawings, Figure 1 is a side elevation of a car with this invention attached. Fig. 2 is a top plan view of the same. Fig. 3 is a vertical section on the line 3 3, Fig. 2. Fig. 4 is a vertical section on the line 4 4, Fig. 2. Fig. 5 is an inverted plan detail view. Fig. 6 is a detail view, parts being broken away; and Fig. 7 is a top plan view of a slight modification.

1 represents the car of approved construction, and 2 the car-sill.

3 is the brake-beam, carrying the brake-shoes 4, said beam being suspended from the car-sill by means of the links 5.

6 represents the side beams of the truck, carrying the journal-boxes of approved construction.

7 represents two standards projecting upwardly from the side beam, and 8 is a rod extending across the truck between the standards 7.

9 is a center post extending upward between the standards 7, around which is secured a coil-spring 10.

11 is a bolster, the ends of which project between the standards 7 and are mounted on top of the said coil-springs 10, as shown in the several figures, the platform of the car being mounted in the usual manner upon bolster 11, whereby the weight of the car is carried by said coil-spring. The dead-lever 12 is suitably secured at 13 to the brake-beam at the inner end of the truck, said lever being disposed at an angle less than a right angle to the brake-beam and inclined toward one side of the truck, the upper end of the lever being bent at 14, so as to form a vertical end 15. 16 is the live-lever suitably secured at 17 to the brake-beam on the other end of the truck, said levers 12 and 16 being connected by a suitable rod or chain 18 at their lower ends below the plane of the brake-beam.

19 is a member secured to the top of the truck and projecting toward the center of the car, said member being provided with a vertical elongated slot 20, through which the upper end 15 of the dead-lever 12 projects.

21 represents pin-holes formed in the vertical walls of the elongated slot 20.

22 is an elongated slot formed longitudinally through the member 19 and at right angles to the vertical elongated slot 20.

23 is an antifriction-roller journaled in the pin-openings in the side wall of the vertical slot 20, whereby said roller is positioned in said slot. 24 is another antifriction-roller positioned within the slot 20, the journals 25 thereof extending through and having bearing in the elongated slot 22 in the member 19, whereby said roller 24 is free to move longitudinally within the slot 20.

26 is a post or standard secured to the cross-bar 8 of the truck and extending upwardly therefrom at an angle and provided with an elongated slot or opening 27, in which is pivoted a bell-crank lever 28.

29 is a wedge pivotally secured to the outer end of the long arm of the bell-crank lever 28 and extending upwardly therefrom through the vertical slot 20 in the member 19, the point of the wedge 29 extending between the rollers 23 and 24 and having engagement therewith, as clearly shown in Figs. 3 and 6.

30 is a rod extending upwardly from the short arm of the bell-crank lever 28 in contact with the sill or platform of the car. (See Fig. 3.)

31 is a bell-crank lever pivoted to the top of the post or standard 26, and 32 is a rod extending from one arm of the bell-crank lever 31 to the bottom of the car-platform, to which it is suitably secured.

33 represents the draft-timbers of the car-platform, from which depend the brackets 34 and 35 at about the center of the car, the lower ends of said bracket being connected by braces 36, which extend transversely of the car-platform from one bracket to the other.

37 represents bell-crank levers pivoted to the under face of the connecting-braces 36, one arm of said bell-crank lever 37 being connected by means of a rod 38 to the bell-crank lever 31.

39 is a lever slidably mounted within the slots 40 of the brackets 34, one end of said lever being connected by the tie-rod 41 to the top of the live-lever 16. The lever 39 is provided with a tangent elongated slot 42, formed in about the center of the same. The other end of the lever 39 is connected to the piston 43 of the air-cylinder 44.

45 is a short lever secured by means of a pivot in the slot at the lower end of one of the brackets 34, the other end of the lever projecting through and loosely working in the slot in the bottom of the opposite bracket. (See Fig. 5.) This lever 35 is provided with a tangent elongated slot 46 similar to the slot 42 in the lever 39.

47 is a connecting-rod provided with the yoked ends 48, said yoke ends being adapted to slip over the levers 39 and 45, respectively, beyond the slots 46 and 42 of said levers.

49 represents pivot-pins extending through the yoked ends of the lever 47 and the slots 42 and 46, whereby said pins are adapted to move in said slots.

50 represents yokes or loops passing around the connecting-rod 47 and secured to bell-crank levers 37 by means of suitable nuts 51, thereby connecting said connecting-rod 47 and placing the same under the influence of the bell-crank levers 37.

The free end of the lever 45 is connected by means of the rod 52 to the live-lever 53 at the other end of the car—that is to say, the live-lever of the other truck.

54 is a rod extending from one end of the long lever 39 and connected to a suitable hand brake wheel or lever. (Not shown.)

The operation of this invention is as follows: If the car is loaded evenly—that is to say, the same weight on each end—the rods 30 will be depressed, thereby operating the bell-crank lever 28, throwing the long arm of said lever upward and projecting the wedge-shaped point of the lever 29 upward through the elongated slot 20 between the rollers 23 and 24, thus moving the movable roller 24 in said slot 20 against the upper end of the dead-lever 15, that projects in said slot 20, thereby moving said dead-lever 15, whereby the slack in the braking apparatus is adjusted alike at each end of the car, thus keeping the brake-shoes in the proper position for effective braking. Simultaneous with this movement the rod 32 is depressed, thereby operating the bell-crank lever 31, which through the connecting-rod 38 operates the bell-crank lever 37, which in turn, through the yokes 50, operates the connecting-rod 47, which, through the pin-and-slot connection 49, 42, and 46, lengthens or shortens the leverage of the levers 39 and 45, thereby equalizing or regulating the braking power. The braking-shoes are set in a proper position with reference to the wheels when the car is empty, and, as has been heretofore pointed out, the load of the car changes the position of the shoes, thus reducing the effectiveness of the braking and causing the shoes to stick to the wheels. Above we have shown by our improved adjuster that we adjust the braking mechanism automatically in accordance with the load.

Our invention is further adapted to adjust the braking mechanism at one end only of a car, and in this connection it will be assumed that one end of the car is loaded to its full capacity while the other end of the car carries only a slight weight in proportion. Under these circumstances the braking mechanism of one end of the car should be adjusted more than the braking mechanism of the other end of the car, so that there will be no slack or play in the braking mechanism.

In our invention the heavily-loaded end will by reason of the rods 30 and 32 adjust the braking mechanism at one end of the car only if the weight is carried all at one end of the car; but if there is unequal weight on the trucks of the car the mechanism that we have described will adjust the brakes and the leverage of the braking power according to the weight on the respective trucks, so that the brakes on the respective trucks can be applied equally—that is to say, one will be as effective as the other and at the same time there will be no tendency of the brakes to stick. This individual adjustment according to the weights on the respective trucks is effected by means of the pin-and-slot connection between the connecting-rod 47 and the levers 45 and 39, operated by means of the bell-crank lever 37, connecting-rod 38, and bell-crank lever 31, and the rods 32, as will be readily understood by the above specification.

To adapt this mechanism to mining-cars, we form a pin-and-slot connection between the rod 41$^a$, extending from the live-lever at one end of the truck, and the lever 39$^a$ and a similar pin-and-slot connection between the free end of the lever 45$^a$ and the connecting-rod 41$^b$, which is secured to the live-lever on the other truck, as clearly shown in Fig. 7. In place of the pin-and-slot connection between the connecting-rod 47 and the levers 45 and 39 we pivot the connecting-rod 47$^a$ to the bell-crank levers 37$^a$ and to the levers 39$^a$ and 45$^a$.

The operation of the construction shown in Fig. 7 is the same as that described in connection with the other construction inasmuch as the slots in the center of the levers 39 and 45 are formed near the ends of said levers and perform the same function, both levers being connected by the rod 47$^a$. The change of leverage is effected by means of the bell-crank levers 37$^a$, one end of which is pivoted to the connecting-rod 47$^a$. When the bell-cranks are operated, the levers to which they are connected through the rod 47$^a$ are slid from one side to the other, so that the rods change their position in the elongated slots in the ends of the levers.

What we claim, and desire to secure by Letters Patent, is—

1. In a brake apparatus, the combination with the live-levers of a series of levers operated by the means connecting said series of levers to the platform of a car, of the dead-levers and means connecting them with the platform of a car, whereby the braking power is adjusted at each end of a car according to the load.

2. In a brake apparatus, the combination with the dead-lever, a bracket having a slot in which the upper end of the lever travels, a fixed antifriction-roller mounted in said slot back of the said lever and means attached to the platform of a car adapted to enter said slot between the said roller and lever whereby the said lever is adjusted according to the weight on said platform.

3. In a brake apparatus, the combination with the dead-lever, a bracket having a slot in which the upper end of the lever travels, an adjustably-fixed roller mounted in said slot back of said lever, means attached to the platform of a car adapted to enter said slot between said roller and lever and a roller loosely mounted in said slot between said means and lever.

4. In a brake apparatus, the combination with the dead-lever, a bracket having an elongated vertical slot, a roller adjustably mounted in said slot, an elongated longitudinal slot, a roller loosely journaled in the longitudinal slot and free to move in the vertical slot, a bell-crank lever mounted on the truck of a car, a wedge-shaped lever pivoted to one end of said lever and projecting through the vertical slot in said member between the two rollers, and a rod connecting the other end of the bell-crank lever with the car-platform.

5. In a brake apparatus, the combination with the draft-timbers of a car of a long lever loosely secured thereto, a short lever pivoted at one end to one of the draft-timbers, an elongated tangent slot in said levers, a connecting-bar the ends of which are connected to the said levers by a pin secured in said tangent slots, a bell-crank lever one end of which is secured to said connecting-bar, a rod connecting the other end of the bell-crank lever with the car-platform, and a brake-cylinder, the piston of which is connected to the long lever near one end thereof.

The foregoing specification signed this 11th day of June, 1901.

ROBBERT B. PAXTON.
JOSEPH B. DRISCOLL.

In presence of—
EDWIN S. CLARKSON,
JNO. R. ADAMS.